United States Patent
McGlinchy et al.

(10) Patent No.: US 6,244,012 B1
(45) Date of Patent: Jun. 12, 2001

(54) MUNTIN GRID AND JOINER

(75) Inventors: Timothy Bryan McGlinchy, Twinsburg; Mohamed C. Khalfoun, Cleveland Heights, both of OH (US)

(73) Assignee: Glass Equipment Development, Inc.

( * ) Notice: Subject to any disclaimer, the term of this patent is extended or adjusted under 35 U.S.C. 154(b) by 0 days.

(21) Appl. No.: 09/233,834

(22) Filed: Jan. 20, 1999

(51) Int. Cl.[7] .................................. E04C 2/42; E06B 3/60
(52) U.S. Cl. ...................... 52/665; 52/656.9; 52/204.61; 403/247; 403/252; 403/460
(58) Field of Search ........................... 52/663, 664, 665, 52/668, 656.8, 656.9, 311.3, 456, 204.61; 403/247, 252, 400, 251, 386

(56) References Cited

U.S. PATENT DOCUMENTS

| | | | |
|---|---|---|---|
| 3,785,110 | * | 1/1974 | Galloway et al. ............... 52/665 X |
| 4,019,300 | * | 4/1977 | Sauer et al. ........................ 52/665 |
| 4,683,634 | * | 8/1987 | Cole . | |
| 5,048,997 | * | 9/1991 | Peterson ........................... 403/295 |
| 5,099,626 | | 3/1992 | Seeger . | |
| 5,177,920 | * | 1/1993 | Rafeld ............................... 52/314 |
| 5,678,377 | | 10/1997 | Leopold . | |
| 5,791,102 | * | 8/1998 | Sheath et al. .................. 52/204.7 |

FOREIGN PATENT DOCUMENTS

3225651 * 1/1984 (DE) ..................................... 52/665

OTHER PUBLICATIONS

*Contoured Muntin Bar External Intersect*, Copyright 1996–1998 Allmetal, Inc.

*Bayform Solutions For The Window Industry*, Copyright© 1995.

* cited by examiner

*Primary Examiner*—Robert Canfield
(74) *Attorney, Agent, or Firm*—Watts Hoffmann Fisher & Heinke

(57) ABSTRACT

A muntin bar joiner for connecting muntin bars in a grid. The muntin bar comprises a relatively flat, thin body, a first muntin bar engagement leg extending from one end of the body, a second muntin bar engagement leg extending from an opposite end of the body, and first and second abutments extending from the body. The muntin bar engagement legs extend along a longitudinal axis of the joiner and the first and second abutments extend from the body transverse to the axis. Each abutment comprises a muntin bar abutment face oriented in a direction transverse to the axis, with the abutment faces facing in opposite axial directions.

The disclosed joiner has opposite body sides that define substantially parallel major surfaces and opposite edges that are substantially parallel and extend substantially parallel to the axis. Different embodiments are disclosed in which the abutments extend from body sides or body edges.

12 Claims, 4 Drawing Sheets

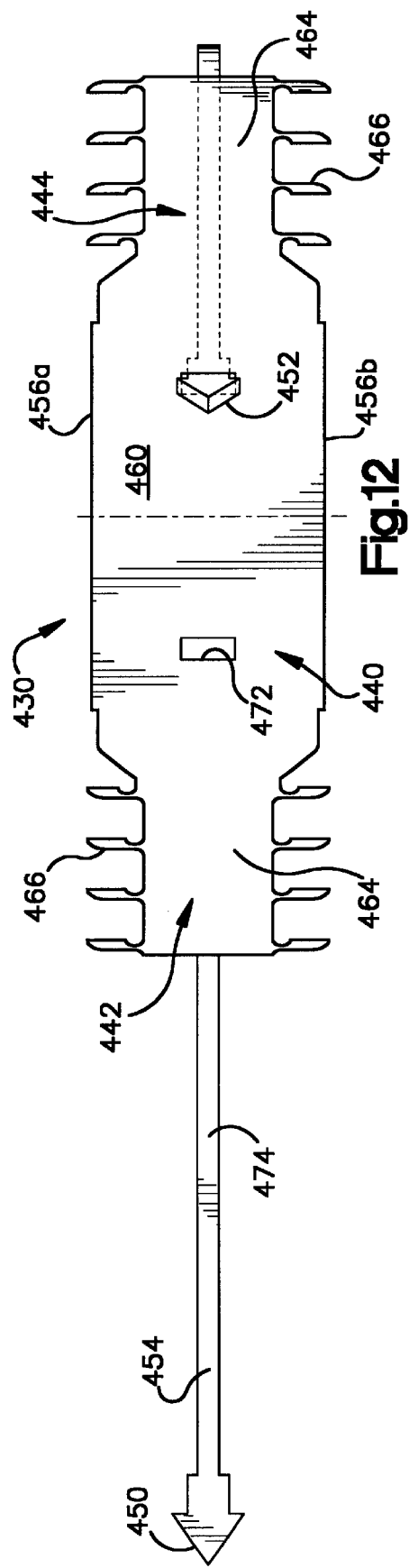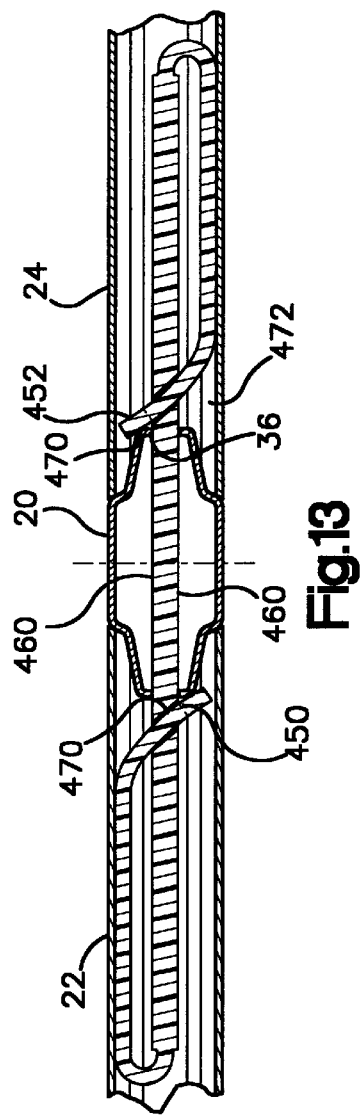

MUNTIN GRID AND JOINER

FIELD OF THE INVENTION

The present invention relates to muntin grid joiners and more particularly to muntin grid joiners that remain hidden from view while joining muntin bars together.

BACKGROUND OF THE INVENTION

Grids formed by interconnected muntin bars are installed between glass panes in insulating glass units used in windows and doors. Joiners for tubular metal muntin bars are in widespread use in constructing such grids. Some joiners have a square central body and four legs projecting at right angles to each other from the body. The legs telescope into four respective muntin bars and the joiner body forms a visible juncture of the bars. With the advent of contoured muntin bars that may have differing cross sectional shapes and be variously colored, the use of visible joiners has become complicated because of the multiplicity of joiner types required to produce a full range of muntin grid shapes and colors.

Joiners have been proposed that secure muntin bars together while remaining hidden from view when the final grid is installed in a window or door. Hidden muntin bar joiners have reduced the inventory problems associated with visible joiners because the joiner color need not match the muntin bar colors and the joiner shape is not dependent on the muntin bar profile. Nevertheless, hidden joiners have produced inventory problems of their own.

The proposed hidden joiners were constructed so that one joiner section was inserted in a muntin bar and then through a slot in a second transverse muntin bar after which it mated with a second joiner section. The second joiner section was telescoped into a third muntin bar—either before or after mating with the first joiner section—so that the first and third muntin bars were aligned and the second muntin bar extended transversely with respect to them. The ends of the first and third muntin bars were cut to interfit with the second muntin bar and form a grid juncture.

The first and second joiner sections were constructed and arranged so that they could be pushed together and permanently secured. The proposed construction provided a pair of barbed stems projecting from the first joiner section and a female receptacle for the stems in the second joiner section. Consequently, window and door producers were required to inventory multiple joiner sections for every muntin bar size being fabricated into grids.

The present invention provides a new and improved one piece muntin bar joiner that is easily and quickly installed, hidden from view in the assembled grid, and minimizes muntin bar joiner inventory problems attendant fabricating muntin grids.

SUMMARY OF THE INVENTION

The present invention provides a muntin bar joiner comprising a relatively flat, thin body, a first muntin bar engagement leg extending from one end of the body, a second muntin bar engagement leg extending from an opposite end of the body and first and second abutments extending from the body. The muntin bar engagement legs extend along a longitudinal axis of the joiner and the first and second abutments extend from the body transverse to the axis. Each abutment comprises a muntin bar abutment face oriented in a direction transverse to the axis, with the abutment faces facing in opposite axial directions. One of the abutments is constructed for making latching engagement with a muntin bar.

In preferred embodiments of the invention opposite sides of the body define substantially parallel major surfaces having substantially parallel opposite edges extending substantially parallel to the axis. One abutment comprises a resiliently deflectable finger. In one preferred embodiment the abutment extends from one of the body sides. In another embodiment the abutment extends from a body edge.

The new joiner is assembled into a muntin grid by passing one muntin bar engagement leg through aligned slits in a muntin bar so the engagement legs project from opposite sides of the muntin bar. The joiner body is secured in position within the muntin bar by the muntin bar engagement abutments. The abutments engage spaced locations on the muntin bar and resist joiner body motion relative to the muntin bar. The first and second muntin bar engagement legs are telescoped into second and third muntin bar ends, respectively, to complete a muntin bar grid joint.

Additional features and advantages of the invention will become apparent from the following descriptions of preferred embodiments made with reference to the accompanying drawings.

DETAILED DESCRIPTION OF PREFERRED EMBODIMENTS OF THE INVENTION

Figure 1:
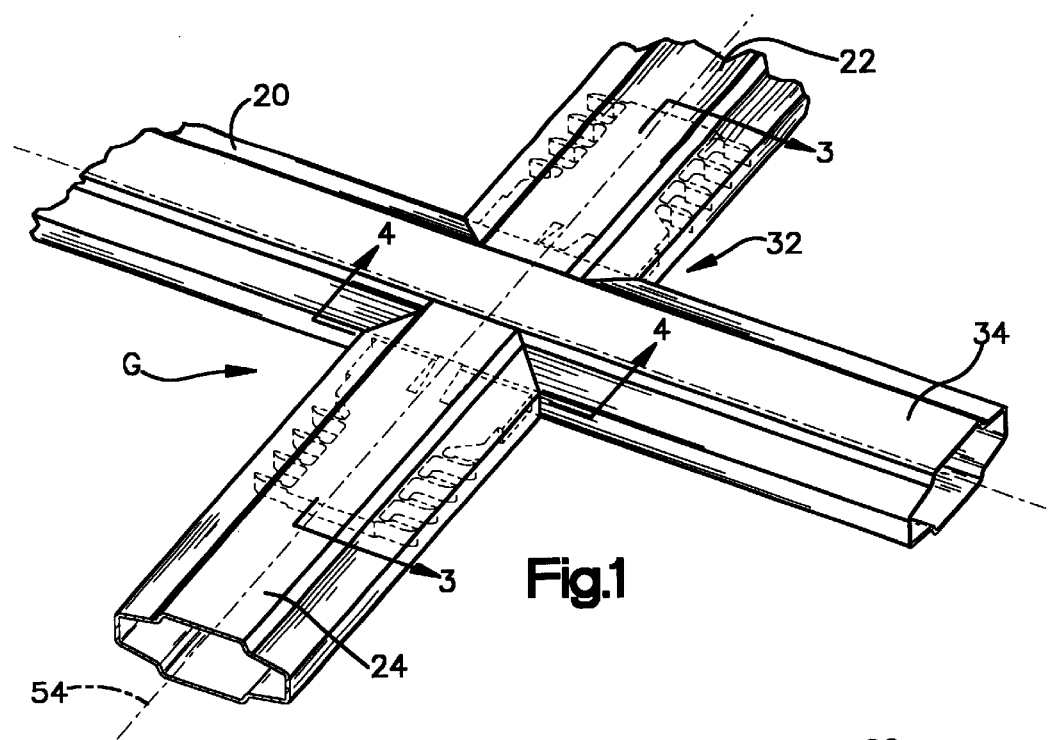
FIG. 1 is a fragmentary view of a muntin bar grid constructed according to the invention.

Part of a muntin bar grid G constructed according to the invention is illustrated in FIG. 1. The illustrated grid G is formed from a lattice-like assemblage of hollow, thin-walled metal tubes that is mounted between panes of glass in an insulating glass unit (not shown). Insulating glass units typically form the glazing in windows and doors, with muntin grids providing decorative architectural features. Each muntin bar forming tube has a cross sectional shape that is contoured to make the grid resemble traditional milled wood muntins that support and separate individual glass panes.

Referring to FIGS. 1–5, the illustrated grid G comprises vertically extending muntin bars 20 (only one of which illustrated), each traversing the entire height of the insulating glass unit, horizontal muntin bars 22, 24 (only two of which are illustrated) that extend between and join the vertical bars 20, and muntin bar joiners 30 that secure the bars 20, 22, and 24 together at their intersections 32. The illustrated muntin bars are formed from roll formed sheet metal that defines a closed cross sectional shape with the ribbon edges abutting each other to form a side seam 33. The illustrated muntin bars have front and rear faces 34, facing inwardly and outwardly of the window or door in which the insulating glass unit is installed, and lateral faces 35 transverse to the insulating glass unit plane. Each face 34 comprises a central flat face 34a that is flanked by lateral extending angled faces 34b, each extending to a respective lateral face 35. The faces 34a, 34b are joined by a small shoulder formation 34c. The lateral faces 35 are flat and relatively short and the overall muntin bar thickness is not great because the space between the glass panes of the insulating glass panel is not great. The side seam 33 extends along the centerline of one of the lateral faces. The muntin bars are painted, or otherwise colored, to match or coordinate with the window or door frame color. While a particular muntin bar grid formation and cross sectional configuration have been illustrated and described, the muntin bars and the grid G may be differently configured, if desired. The muntin bars may be constructed differently as well. For example, the bars may be formed from an extruded metal or plastic material.

The muntin bars 20 extend into close proximity with a spacer frame at the insulating glass unit periphery and are secured to the spacer frame by suitable clips (not illustrated). A series of aligned, narrow slits 36 is formed at spaced locations along the bars 20 at the locations of the intersections. Each slit 36 is generally rectangular and sized so that its length dimension is less than the lateral width of the muntin bars and its width dimension is just slightly greater than the thickness of the joiner 30. The slits 36 at each intersection location are aligned so that a joiner 30 can pass through both slits and connect with the muntin bars 22, 24 at the intersection 32. In the illustrated grid G, the slits 36 are horizontally aligned, but other grid configurations are possible where the slits may not be horizontally aligned. For example, the grid can have a "diamond pane" configuration that simulates a window consisting of numerous diamond shaped glass panes.

Figure 3:
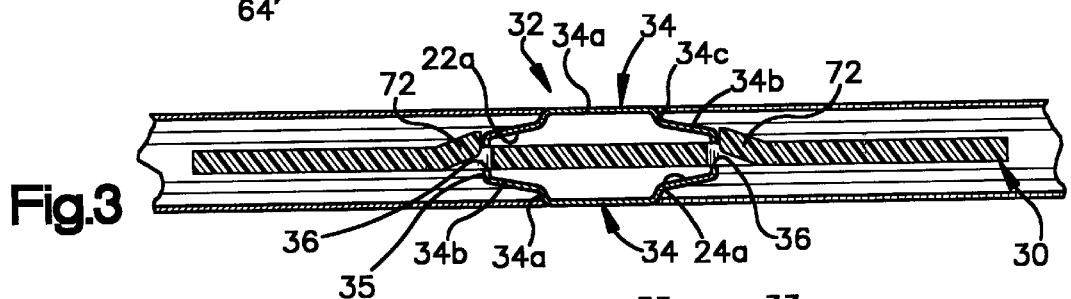
FIG. 3 is a fragmentary cross sectional view seen approximately from the plane indicated by the line 3—3 of FIG. 1.
Figure 4:
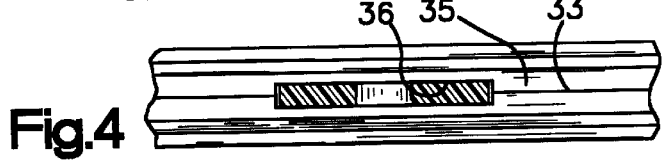
FIG. 4 is a fragmentary cross sectional view seen approximately from the plane indicated by the line 4-4 of FIG. 1.
Figure 5:
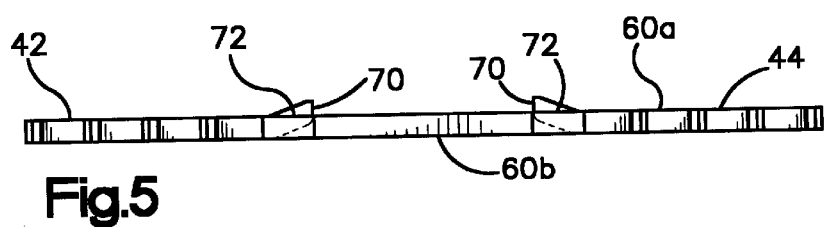
FIG. 5 is an elevation view seen approximately from the plane indicated by the line 5–5 of FIG. 2.

The muntin bars 22, 24 are shaped the same as the bars 20 and, in the illustrated grid G, extend horizontally from the muntin bar 20. The muntin bar ends 22a, 24a, are cut so that they interfit with the profile of the bar 20 to produce "mitred" joints at the muntin bar intersection 32. The cross sectional shape of the end cuts 22a, 24a is illustrated in FIG. 3. The projecting end portions of the bars 22, 24 extend to the shoulder formations 34c on the bar 20 while the cut lateral face ends of the muntin bars 22, 24 engage the lateral faces 35 of the muntin bar 20. The slits 36 in the muntin bar 20 are hidden by the interfitting muntin bars.

The muntin bar joiner 30 secures the muntin bars together and is hidden from view by the muntin bars when they are properly positioned to form the intersection 32. The muntin bar joiner 30 comprises a body 40, a first muntin bar engagement leg 42 connectable to the muntin bar 22, a second muntin bar engagement leg 44 connectable to the muntin bar 24, and first and second abutments 50, 52 extending from the body 40 for securing the body in place at the intersection 32.

The joiner body 40 is constructed and arranged for insertion through the aligned slits 36 in the muntin bar 20 so that the body 40 extends transverse to the muntin bar with the legs 42, 44 projecting from opposite muntin bar sides. The body 40 extends along a longitudinal axis 54 and is illustrated as flat and thin, having opposite edges 56a, 56b extending in the direction of the axis and opposite sides 60a, 60b. The edges 56 extend generally parallel to each other and the opposite sides define major faces that are generally parallel to each other. The body cross section is an elongated rectangular shape forming a cross sectional silhouette that conforms to the shape of the muntin bar slits 36 (See FIG. 4). The joiner 30 is a one piece construction that is preferably formed from an injection molded plastic material. The body 40 is strong and stiffly resists bending.

Figure 2:
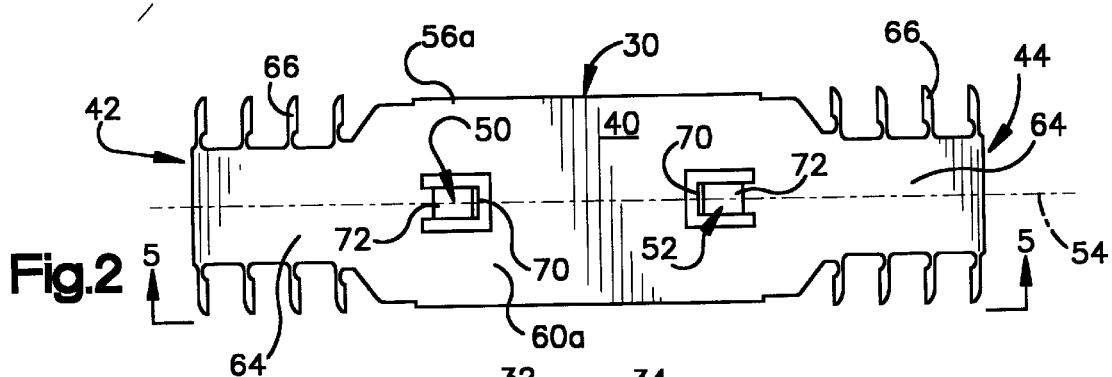
FIG. 2 is an elevation view of a muntin bar joiner constructed according to the invention that is used in the grid of FIG. 1 to secure muntin bars together.

The muntin bar engagement legs 42, 44 are constructed and arranged for quick and easy attachment to the muntin bars 22, 24 during construction of the grid G. The preferred legs telescope into, and frictionally engage, the muntin bars 22, 24. As best seen in FIG. 2, the legs 42, 44 are identical with each comprising a central supporting stem 64 and resiliently flexible gripping ribs 66 projecting from the stem 64. In the preferred and illustrated joiner 30 the stem 64 is continuous with the body 40 and projects from the body along the axis 54. The ribs 66 are continuous with and extend laterally from the stem 64. The thickness of the stems and ribs is the same as the thickness of the body 40 and the lateral width of the legs is the same as the body 40. The ribs 66 resemble comb teeth and are dimensioned so that when the legs are telescoped into a muntin bar, the rib tips engage the interior muntin bar wall and resiliently flex and bend backwards slightly as the leg advances into the muntin bar. The legs are thus firmly secured in place in the muntin bars. The preferred and illustrated ribs are formed with slightly undercut sections adjacent the stems to facilitate rib bending when the joiner legs are inserted into the muntin bar ends.

The abutments 50, 52 project from the body 40 in a direction transverse the axis 54 and serve to secure the joiner 30 to the muntin bar 20. Each abutment comprises a muntin bar abutment face 70 oriented in a direction transverse to the axis 54. The abutment faces 70 face in opposite directions. As illustrated by FIGS. 1–5 the abutments 50, 52 are identical. Each abutment comprises a cantilevered finger 72 that is supported by the body 40 along the axis 54. Each projecting finger tip extends out of the cross sectional silhouette of the body 40 in a direction transverse to the axis 54 with the finger tip end region forming the abutment face 70. The fingers 72 extend towards each other. The abutment faces 70 confront each other. The abutment faces 70 are spaced axially apart a distance of just greater than the muntin bar width.

In the preferred and illustrated embodiment of the invention one of the abutments makes latching engagement with the muntin bar 20. When the joiner 30 is assembled to the muntin bar 20, one leg 42 passes through the slits 36 and emerges from the far side of the muntin bar. The abutment 50 adjacent the leg also passes through the muntin bar. As the abutment 50 passes through each slit, the muntin bar wall bounding each slit engages the finger and resiliently deflects the finger toward the plane of the body 40. When the finger 72 clears the slit, it moves into position for latching engagement with the muntin bar 20 by springing back to its undeflected position. After the finger clears the second slit it springs back to the undeflected position and confronts the external muntin bar wall bounding the second slit 36. When the abutment 50 clears the second slit 36, the second abutment 52 has moved to confront the external muntin bar wall bounding the first slit 36. The abutment 52 engages the muntin bar and prevents any further advance of the joiner through the muntin bar 20. The abutment 50 abuts the muntin bar wall on the opposite side of the bar to prevent withdrawal of the joiner from the muntin bar 20.

If the joiner 30 is assembled to the muntin bar 20 by advancing the leg 44 through the slits 36, the abutment 52 makes latching engagement with the external muntin bar wall bounding the second slit 36 while the abutment 50 confronts the opposite muntin bar side wall and prevents further advancement of the joiner into the muntin bar.

The muntin bars 22, 24 may be pushed onto the legs 42, 44 after the joiner is assembled to the muntin bar 20. Alternatively, one bar 22, or 24 may be assembled to the joiner 30 before the joiner is connected to the muntin bar 20.

Figure 6:
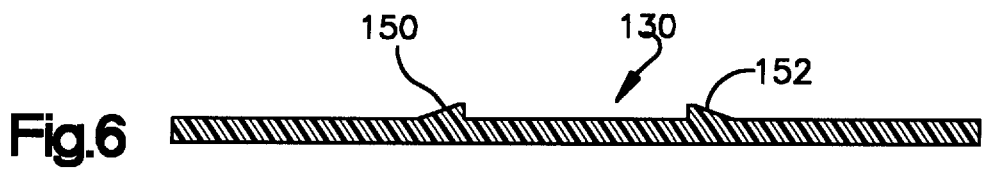
FIG. 6 is an elevation view of an alternative muntin bar joiner construction made according to the invention for use in fabricating the grid of FIG. 1.
Figure 7:
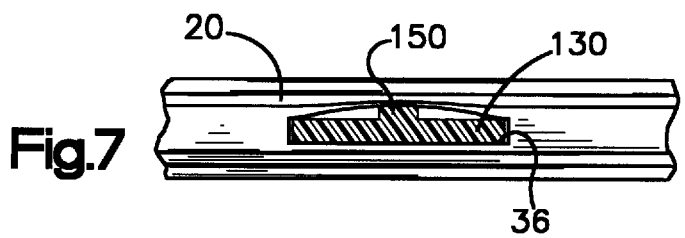
FIG. 7 is a view of the joiner of FIG. 6 being assembled into a muntin bar.

FIGS. 6 and 7 illustrate a modified joiner 130 that is constructed like the joiner 30 except that the joiner 130 comprises abutments 150, 152 that are positioned the same as the abutments 50, 52 but are formed by wedge-like ramps molded into the joiner side 160a and projecting from the body 140. The ramps are essentially inflexible, unlike the abutments 50, 52. When the joiner 130 is inserted through the muntin bar 20 the leading abutment 150 or 152 passes through the first and second slits 36. The leading abutment resiliently displaces the muntin bar wall bounding each slit as the abutment passes. This operation is illustrated—in an exaggerated way—by FIG. 7, which is a view like FIG. 4 but shows the abutment flexing the muntin bar wall. After the abutment passes, the bar wall snaps back to its original position. When the abutment passes the second slit, it makes latching engagement with the muntin bar in that the abutment confronts the muntin bar wall bounding the second slit and prevents withdrawal of the joiner. The second abutment meanwhile confronts the muntin bar wall bounding the first slit 36 and prevents further joiner movement into the muntin bar.

Figure 8:
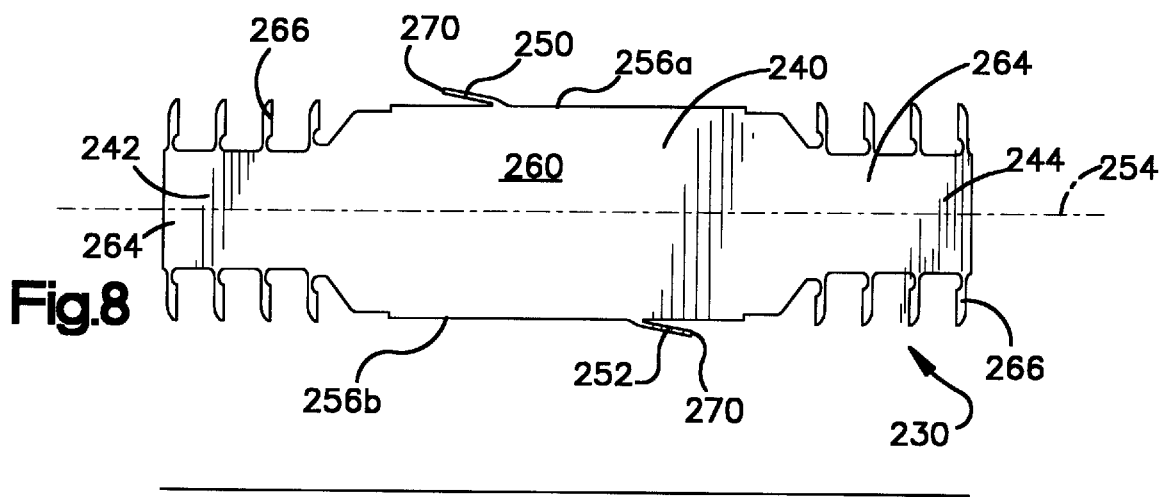
FIG. 8 is an elevation view of another alternative muntin bar joiner construction made according to the invention for use in fabricating the grid of FIG. 1.
Figure 9:
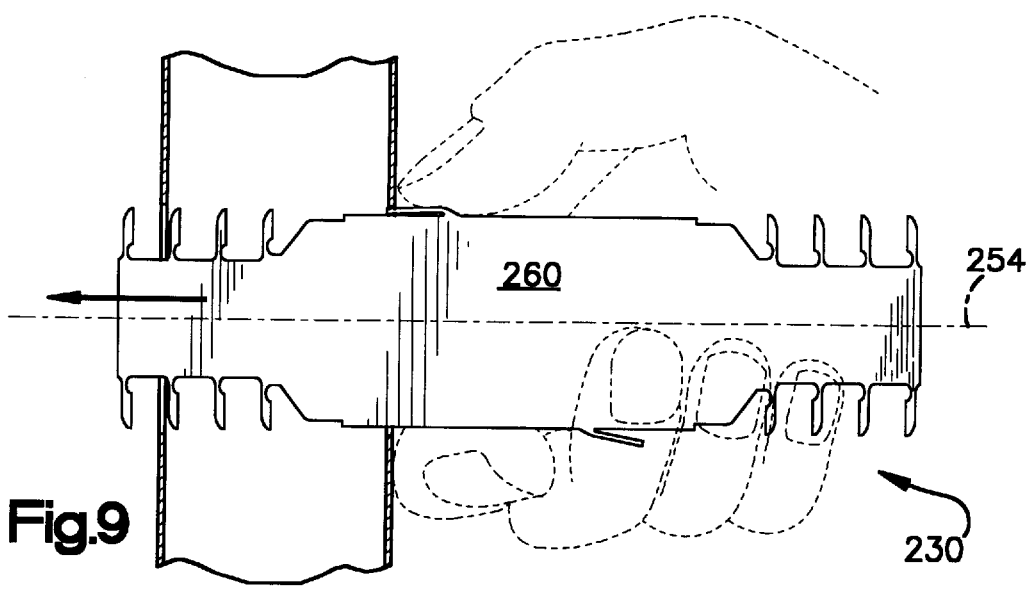
FIGS. 9 and 10 illustrate the joiner of FIG. 8 at different stages of its assembly into a muntin bar.
Figure 10:
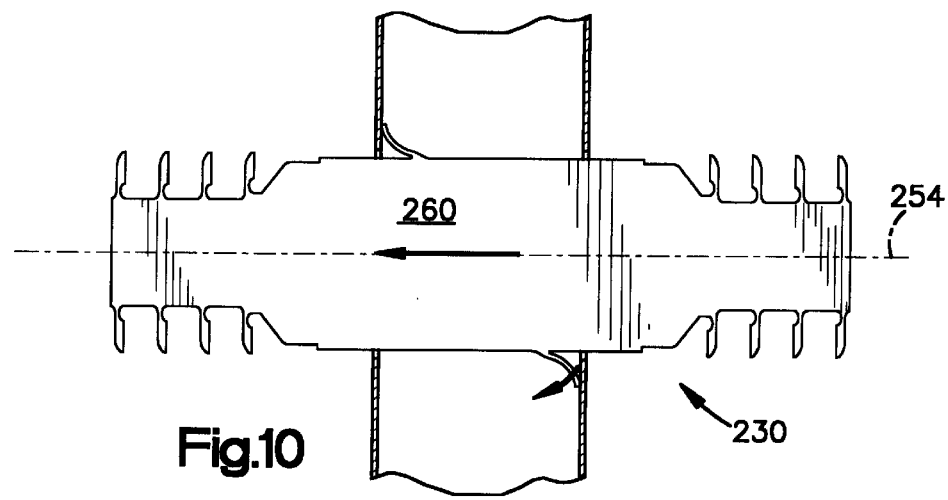

FIGS. 8–10 illustrate another modified joiner 230 embodying the invention. The muntin bar joiner 230 secures the muntin bars together and is hidden from view by the muntin bars when they are properly positioned to form the intersection 32. The joiner 230 comprises a body 240, a first muntin bar engagement leg 242 connectable to the muntin bar 22, a second muntin bar engagement leg 244 connectable to the muntin bar 24, and first and second abutments 250, 252 extending from the body 240 for securing the body in place at the intersection 32.

The joiner body 240 is constructed and arranged for insertion through aligned slits 36 in the muntin bar 20 so that the body 240 extends transverse to the muntin bar and the legs 242, 244 project oppositely from the muntin bar. The body 240 extends along a longitudinal axis 254 and is illustrated as flat and thin, having opposite edges 256a, 256b extending in the direction of the axis and opposite sides, only one of which is shown at 260. The edges 256 extend generally parallel to each other and the opposite sides define major faces that are generally parallel to each other. The body cross section is an elongated rectangular shape forming a cross sectional silhouette that conforms to the shape of the muntin bar slit 36. The joiner 230 is a one piece construction that is preferably formed from an injection molded plastic material that produces a body 240 that is strong and stiffly resists bending.

The muntin bar engagement legs 242, 244 are constructed and arranged for quick and easy attachment to the muntin bars 22, 24 during construction of the grid G. The preferred legs telescope into, and frictionally engage, the muntin bars 22, 24. As best seen in FIG. 8 the legs 242, 244 are identical with each comprising a central supporting stem 264 and resiliently flexible gripping ribs 266 projecting from the stem 264. In the preferred and illustrated joiner 230 the stem 264 is continuous with the body 240 and projects from the body along the axis 254. The ribs 266 extend laterally from the stem 264. The thickness of the stems and ribs is the same as the thickness of the body 240 and the lateral width of the legs is the same as the body 240. The ribs 266 have length dimensions that are such that when the legs are telescoped into a muntin bar, the rib tips are resiliently flexed by engagement with the interior muntin bar wall and bend backwards slightly as the leg advances into the muntin bar. The bent ribs resist pulling the legs back out of the muntin bar end so the legs are firmly secured in place in the muntin bars.

The abutments 250, 252 project from the body 240 in a direction transverse to the axis 254 and serve to secure the joiner 230 to the muntin bar 20. Each abutment comprises a muntin bar abutment face 270 oriented in a direction transverse to the axis 254. The abutment faces 270 face in opposite directions. As illustrated by FIGS. 8–10 each abutment comprises a cantilevered finger that is supported by the body 240 and extends transverse to the axis 254 from a body edge 256. Each projecting finger tip extends out of the cross sectional silhouette of the body 240 with the finger tip end region forming the abutment face 270. The abutment fingers extend away from each other. The abutment faces 270 face in opposite directions and away from each other. The abutment faces 270 are spaced axially apart a distance of just greater than the muntin bar width. As illustrated, the abutment 250 extends from the edge 256a adjacent the leg 242, while the abutment 252 extends from the edge 256b adjacent the leg 244.

In the preferred and illustrated embodiment of the invention one of the abutments makes latching engagement with the muntin bar 20. FIGS. 9 and 10 illustrate the joiner 230 being manually assembled to a muntin bar 20. The leg 242 is pushed through the first slit 36. The abutment finger 250 is manually depressed so it can pass through the slit 36 without interference (see FIG. 9). When the finger 250 passes the slit 36 it springs back to its unflexed condition inside the muntin bar and the joiner is advanced so the leg 242 passes through the second slit 36. As the joiner advances, the abutment finger 252 is resiliently depressed by engagement with the side of the first slit 36. The abutment finger 250 engages the inner wall of the muntin bar 20 adjacent the second slit and as the joiner advances the finger 250 is resiliently deflected (FIG. 10). Resilient deflection of the finger 250 provides for joiner over-travel, enabling the finger 252 to pass completely through the first slit 36 and resiliently return to its undeflected position FIG. 10) for making latching engagement with the muntin bar 20. The joiner 230 is then released and the finger 250 resiliently returns toward its undeflected position. In so doing, the finger 250 pushes the joiner in a direction to engage the finger 252 with the muntin bar wall adjacent the first slit 36 and resiliently deflect the finger 252. The fingers 250, 252 reach an equilibrium state where each resiliently engages an internal wall of the muntin bar 20 and each reacts against the other to maintain the joiner engaged with, and assembled to, the muntin bar 20.

If the joiner 230 is assembled to the muntin bar 20 by advancing the leg 244 through the slits 36, the abutment 252 engages the muntin bar interior wall bounding the second slit 36 and limits further advancement of the joiner into the muntin bar. The abutment 250 makes latching engagement with opposite muntin bar interior wall.

The muntin bars 22, 24 may be pushed onto the legs 242, 244 after the joiner is assembled to the muntin bar 20. Alternatively, one bar 22, or 24 may be assembled to the joiner 230 before it is connected to the muntin bar 20.

Figure 11:
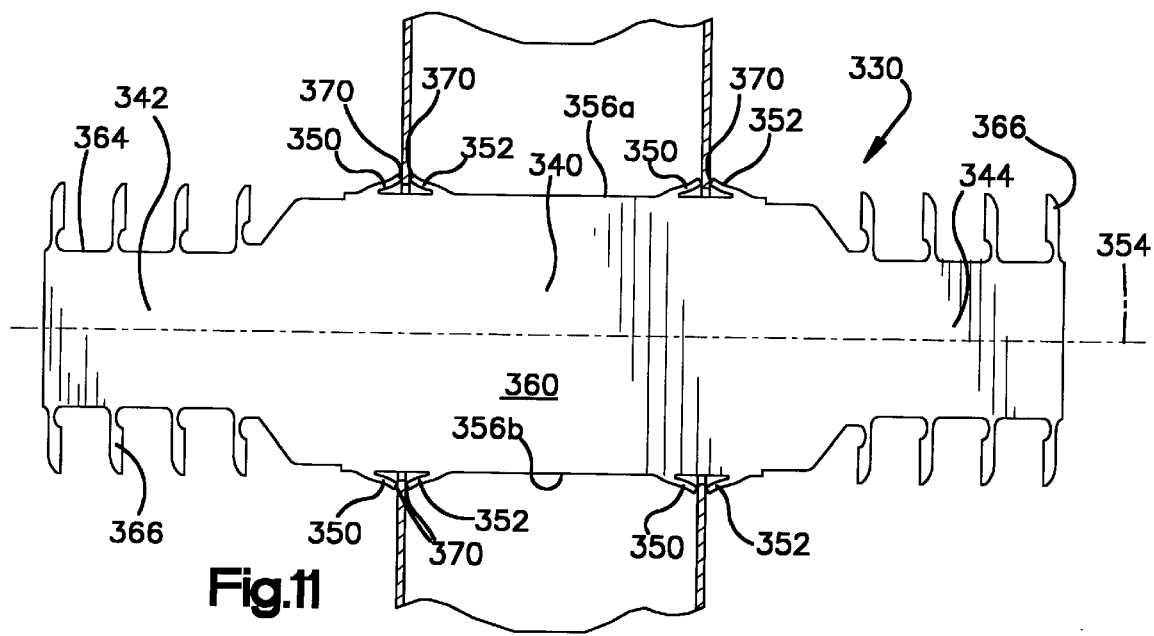
FIG. 11 is an elevational view of still another alternative muntin bar joiner construction made according to the invention for use in fabricating the grid of FIG. 1; and, FIGS. 12 and 13 illustrate another alternative embodiment of a muntin bar joiner constructed according to the present invention for fabricating muntin grids.

FIG. 11 illustrates still another modified joiner 330 embodying the invention. The muntin bar joiner 330 secures the muntin bars together and is hidden from view by the muntin bars when they are properly positioned to form the intersection 32. The joiner 330 comprises a body 340, a first muntin bar engagement leg 342 connectable to the muntin bar 22, a second muntin bar engagement leg 344 connectable to the muntin bar 24, and first and second abutments 350, 352 extending from the body 340 for securing the body in place at the intersection 32.

The joiner body 340 is constructed and arranged for insertion through aligned slits 36 in the muntin bar 20 so that the body 340 extends transverse to the muntin bar and the legs 342, 344 project oppositely from the muntin bar. The body 340 extends along a longitudinal axis 354 and is illustrated as flat and thin, having opposite edges 356a, 356b extending in the direction of the axis and opposite sides 360, only one of which is shown. The edges 356 extend generally parallel to each other and the opposite sides define major faces that are generally parallel to each other. The body cross section is an elongated rectangular shape forming a cross sectional silhouette that conforms to the shape of the muntin bar slit 36. The joiner 330 is a one piece construction that is preferably formed from an injection molded plastic material that produces a body 340 that is strong and stiffly resists bending.

The muntin bar engagement legs 342, 344 are constructed and arranged for quick and easy attachment to the muntin bars 22, 24 during construction of the grid G. The preferred legs telescope into, and frictionally engage, the muntin bars 22, 24. The illustrated legs 342, 344 are identical with each comprising a central supporting stem 364 and resiliently flexible gripping ribs 366 projecting from the stem 364. In the preferred and illustrated joiner 330 the stem 364 is continuous with the body 340 and projects from the body along the axis 354. The ribs 366 extend laterally from the stem 364 and are undercut slightly to increase their flexibility. The thickness of the stems and ribs is the same as the thickness of the body 340 and the lateral width of the legs is the same as the body 340. The ribs 366 have length dimensions that are such that when the legs are telescoped into a muntin bar, the rib tips are resiliently flexed by engagement with the interior muntin bar wall and bend backwards slightly as the leg advances into the muntin bar. The legs are thus firmly secured in place in the muntin bars.

The abutments 350, 352 project from the body 340 in a direction transverse to the axis 354 and serve to secure the joiner 330 to the muntin bar 20. Each abutment comprises a muntin bar abutment face 370 oriented in a direction transverse to the axis 354. The abutment faces 370 face in opposite directions. As illustrated by FIG. 11, each abutment comprises a cantilevered finger that is supported by the body 340 and extends transverse to the axis 354 from a body edge 356. Each projecting finger tip extends out of the cross sectional silhouette of the body 340 with the finger tip end region forming the abutment face 370. The abutment fingers extend toward each other. The abutment faces 370 face in opposite directions and the fingers are spaced axially with respect to each other to enable them to engage opposite sides of a common muntin bar wall. In the embodiment illustrated by FIG. 11, four pairs of the abutments 350, 352 are provided on the joiner 330. The abutment pairs are disposed on each edge 356 near the juncture of the body 340 and the legs 342, 344.

In the preferred and illustrated embodiment of the invention one of the abutments makes latching engagement with the muntin bar 20. The joiner 330 is manually assembled to a muntin bar 20. The leg 342 is pushed through the first slit 36. The abutment fingers 350 adjacent the leg 342 are resiliently depressed by the muntin bar wall bounding the slit and pass through the slit. The abutment fingers 352 adjacent the leg 342 are manually depressed so they can pass through the first slit 36 without interference. The fingers 352 spring back to their undeflected positions as soon as they pass the first slit 36. The joiner advances so the leg 342 passes through the second slit 36. As the joiner advances further, the abutment fingers 350 adjacent the leg 342 are resiliently depressed by engagement with the side of the second slit 36 and pass through the slit. The adjacent abutment fingers 352 engage the inner wall of the muntin bar 20 adjacent the second slit and as the joiner advances the fingers 352 are resiliently deflected. Resilient deflection of the fingers 352 provides for joiner over-travel, enabling the fingers 350 to pass completely through the second slit 36 and resiliently return to their undeflected positions for making latching engagement with the muntin bar 20.

At the same time, the abutment fingers 350 adjacent the leg 344 have been resiliently deflected by the muntin bar wall bounding the first slit 36 and resiliently return to their first, undeflected positions to make latching engagement with the muntin bar wall adjacent the first slit. The abutment fingers 352 adjacent the leg 344 engage the outer muntin bar wall bounding the first slit 36 and are resiliently deflected to provide joiner over-travel sufficient to assure the adjacent fingers 350 clear the first slit 36.

The joiner 330 is symmetrical so either end can be inserted into the muntin bar 20 and secured in place in the manner described. Although four pairs of abutments 350, 352 have been illustrated as used with the joiner 330, fewer pairs of the abutments may be provided.

FIGS. 12 and 13 illustrate still another embodiment of a muntin bar joiner 430 constructed according to the invention. The muntin bar joiner 430 secures the muntin bars together and is hidden from view by the muntin bars when they are properly positioned to form the intersection 32. The joiner 430 comprises a body 440, a first muntin bar engagement leg 442 connectable to the muntin bar 22, a second muntin bar engagement leg 444 connectable to the muntin bar 24, and first and second abutments 450, 452 extending from the body 440 for securing the body in place at the intersection 32.

The joiner body 440 is constructed and arranged for insertion through aligned slits 36 in the muntin bar 20 so that the body 440 extends transverse to the muntin bar and the legs 442, 444 project oppositely from the muntin bar. The body 440 extends along a longitudinal axis 454 and is illustrated as flat and thin, having opposite edges 456a, 456b extending in the direction of the axis and opposite major surfaces, shown at 460. The edges 456 extend generally parallel to each other and the opposite major faces 460 are generally parallel to each other. The body cross section is an elongated rectangular shape forming a cross sectional silhouette that conforms to the shape of the muntin bar slit 36. The joiner 430 is a one piece construction that is preferably formed from an injection molded plastic material that produces a body 440 that is strong and stiffly resists bending.

The muntin bar engagement legs 442, 444 are constructed and arranged for quick and easy attachment to the muntin bars 22, 24 during construction of the grid G. The preferred legs telescope into, and frictionally engage, the muntin bars 22, 24. The illustrated legs 442, 444 are identical. Each comprises a central supporting stem 464 and resiliently flexible gripping ribs 466 projecting from the stem 464. In the preferred and illustrated joiner 430 the stem 464 is continuous with the body 440 and projects from the body along the axis 454. The ribs 466 extend laterally from the stem 464 and are slightly undercut near their junctures with the stem 466 to increase their flexibility. The thickness of the stems and ribs is the same as the thickness of the body 440 and the lateral width of the legs is the same as the body 440. The ribs 466 have length dimensions that are such that when the legs are telescoped into a muntin bar, the rib tips are resiliently flexed by engagement with the interior muntin bar wall and bend backwards slightly as the leg advances into the muntin bar. The legs are thus firmly secured in place in the muntin bars.

The abutments 450, 452 project from the body 440 in a direction transverse to the axis 454 and serve to secure the joiner 430 to the muntin bar 20. Each abutment comprises a muntin bar abutment face 470 oriented in a direction transverse to the axis 454. The abutment faces 470 face in opposite directions. As illustrated by FIG. 13, each abutment comprises a cantilevered finger that is supported by the body 440 and extends transverse to the axis 454 from a body face 460. Each projecting finger tip extends out of the cross sectional silhouette of the body 440 with the finger tip end region forming the abutment face 470.

In the preferred and illustrated embodiment of the invention each abutment finger extends through an opening 472 formed in the body 440 at a location that is adjacent a wall of the muntin bar 20 when the joiner 430 is installed in the muntin bar 20. The abutment fingers 450, 452 project cantilever fashion from respective openings 472 into engagement with the muntin bar 20. In the preferred embodiment the abutment fingers are resiliently deflected by engagement with the muntin bar. In the illustrated joiner 430, the openings 472 are inclined so that the fingers 450, 452 project at an angle towards the muntin bar wall.

The preferred abutment fingers 450, 452 are integral with and connected to the joiner body 430 by respective flexible straps 474. Each illustrated strap 474 is formed continuously with the joiner body 430 in a common mold and is illustrated as a plastic filament that extends from the end of a joiner leg 442 or 444. The fingers 450, 452 are molded to the ends of the straps 474 and are illustrated as flat, flexible arrow head shaped elements that can be resiliently deformed and pushed through a respective opening 472. The straps 474 are of sufficient length that the fingers 450, 452 can be inserted through the openings 472 with ease. After the fingers pass through their respective openings they return to their undeformed shapes and are thus secured against pulling back out through the opening.

The joiner 430 is secured to the muntin bars 20, 22, 24 by first passing the finger 450 through the joiner opening 472 and inserting the joiner leg 442 partially into the muntin bar 22. The joiner leg 444, the attached finger 452, and the strap 474, are fed through the muntin bar slit 36 until the joiner leg 444 has passed completely through the muntin bar 20. The joiner leg 444 is then pulled so that the abutment finger 450 on the opposite side of the muntin bar 20 overtravels toward the muntin bar and is resiliently deflected by engagement with the muntin bar wall. The abutment finger 452 is then passed through its joiner body opening 472 and the joiner body is released. The finger 450 flexes back toward its undeflected position, urging the finger 452 into resilient engagement with the muntin bar 20 so the fingers 450, 452 are both resiliently deflected by engagement with the muntin bar 20. The muntin bar 22 is pushed fully onto the joiner leg 442 and the muntin bar 24 is pushed onto the joiner leg 444 to complete the grid intersection.

Although the abutment fingers are illustrated as carried on filaments that are continuous with the joiner legs, other constructions are possible. For example, the abutment finger may be carried by strap-like elements that are bonded or otherwise fixed to the joiner legs. Constructions might be made wherein the straps or filaments themselves form the abutments. Abutment fingers constructed in the same general manner as illustrated might even be separate from the joiner, however that would increase the number of parts required to be inventoried and would make assembly more difficult.

While several preferred embodiments of the invention have been illustrated and described in detail, the invention is not to be considered limited to the precise constructions disclosed. Various adaptations, modifications and uses of the invention may occur to those skilled in the art to which the invention relates. The intention is to cover all such adaptations, modifications, and uses that fall within the scope or spirit of the claims.

We claim:

1. A muntin grid that includes a muntin bar joiner detachably joining three muntin bars, the grid comprising:

a first tubular muntin bar having oppositely facing sides that form outwardly facing grid surfaces and an elongated narrow through opening that extends transverse to the first muntin bar, second and third tubular muntin bars that extend transverse to said first muntin bar, each of said second and third muntin bars having oppositely facing sides that form outwardly facing grid surfaces and an open end that abuts said first muntin bar, each said open end surrounding said through opening;

a flat, thin joiner body having a longitudinal axis with opposite edges extending in the direction of said axis and opposite sides defining major faces, said joiner body extending transverse to said first muntin bar through said through opening;

a first leg projecting from said body and telescoping into the second muntin bar, said first leg engaging the second muntin bar to maintain said second muntin bar aligned with said axis in fixed relationship with said joiner;

a second leg projecting from said body and telescoping into said third muntin bar, said second leg engaging the third muntin bar to maintain said third muntin bar aligned with said axis in fixed relationship with said joiner;

first and second abutments extending from said body in a direction transverse to said axis, each abutment comprising an abutment face oriented in a direction transverse to said axis for engaging said first muntin bar and locking said joiner and said second and third muntin bars in position with respect to said first muntin bar, said abutment faces facing in opposite axial directions with one of said abutments comprising a wedge-like ramp for making latching engagement with said first muntin bar.

2. The muntin grid claimed in claim 1 wherein one of said abutment faces is oriented to engage said first muntin bar on one side and said other abutment face is oriented to engage said muntin bar on the opposite side thereof.

3. The muntin grid claimed in claim 2 wherein both of said abutment faces are located externally of said first muntin bar.

4. A muntin bar joiner comprising:
a) a relatively flat, thin body;
b) a first muntin bar engagement leg extending from one end of said body;
c) a second muntin bar engagement leg extending from an end of said body opposite to said one end;
d) said muntin bar engagement legs extending along a longitudinal axis of said joiner, said body having opposite sides defining substantially parallel major surfaces having substantially parallel opposite edges extending substantially parallel to said axis; and,
e) first and second muntin bar abutments projecting from said body in a direction transverse to said axis, each abutment comprising a muntin bar abutment face oriented in a direction transverse to said axis, with said abutment faces facing in opposite axial directions, one of said abutments constructed for making latching engagement with a muntin bar, said one abutment comprising a resiliently deflectable finger extending from one of said edges.

5. The muntin bar joiner claimed in claim 4 wherein the other abutment comprises a resiliently deflectable finger.

6. A muntin bar grid comprising a muntin bar joiner detachably joining three tubular muntin bars comprising:
a) a flat, thin joiner body having a longitudinal axis with opposite edges extending in the direction of said axis and opposite sides defining major faces, said joiner body extending transverse to a first muntin bar through a slit in said first muntin bar;
b) a first leg projecting from said body and said first muntin bar and telescoping into a second muntin bar, said first leg engaging the second muntin bar to maintain said second muntin bar aligned with said axis in fixed relationship said joiner;
c) a second leg projecting from said body and said first muntin bar and telescoping into a third muntin bar, said second leg engaging the third muntin bar to maintain said third muntin bar aligned with said axis in fixed relationship with said joiner;
d) first and second abutments extending from said body in a direction transverse to said axis, each abutment comprising an abutment face oriented in a direction transverse to said axis for engaging said first muntin bar, said abutment faces facing in opposite axial directions, at least one of said abutment faces formed by an abutment member that extends through an opening in said joiner body and engages said first muntin bar.

7. The muntin grid claimed in claim 6 wherein said at least one abutment face is resiliently deflected by engagement with said first muntin bar.

8. The muntin grid claimed in claim 6 wherein said abutment member is integral with and connected to said joiner body by a flexible strip of joiner body material.

9. A muntin bar joiner comprising:
a) a relatively flat, thin body having opposite major faces and substantially parallel side edges extending between ends of the body;
b) a first muntin bar engagement leg continuous with the body and extending from one end of said body;
c) a second muntin bar engagement leg continuous with the body and extending from an end of said body opposite to said one end;
d) said muntin bar engagement legs extending along a longitudinal axis of said joiner; and, e) first and second locking abutments extending from said body in a direction transverse to said axis for engagement with a muntin bar to lock the body in position against movement in the direction of the axis, at least one of said abutments resiliently deflectable by engagement with a muntin bar.

10. The muntin bar claimed in claim 9 wherein said at least one abutment extends from a major face of said body.

11. The muntin bar claimed in claim 10 wherein said at least one abutment extends through an opening in said body and projects into engagement with a muntin bar.

12. The muntin bar claimed in claim 9 wherein said at least one abutment extends from a side edge of said body.

* * * * *